(12) United States Patent
Casebolt et al.

(10) Patent No.: US 6,253,874 B1
(45) Date of Patent: Jul. 3, 2001

(54) METHODS AND APPARATUS FOR INTERCONNECTING HARNESS STRAPS

(75) Inventors: Scott C. Casebolt, St. Paul Park; J. Thomas Wolner, Red Wing, both of MN (US)

(73) Assignee: D B Industries, Inc., Red Wing, MN (US)

( * ) Notice: Subject to any disclaimer, the term of this patent is extended or adjusted under 35 U.S.C. 154(b) by 0 days.

(21) Appl. No.: 09/490,729

(22) Filed: Jan. 25, 2000

Related U.S. Application Data

(63) Continuation of application No. 09/084,030, filed on May 22, 1998, now abandoned.

(51) Int. Cl.[7] .......................................................... A47L 3/04
(52) U.S. Cl. ............................................................ 182/3; 182/6
(58) Field of Search ...................................... 182/3, 4, 5, 6, 182/7, 8, 9; 244/151 A, 151 R

(56) References Cited

U.S. PATENT DOCUMENTS

| | | | |
|---|---|---|---|
| 2,546,689 | 3/1951 | Frieder et al. | 244/151 R X |
| 2,574,178 | 11/1951 | Haller | 182/3 |
| 2,817,393 | 12/1957 | Mitchell | 182/3 X |
| 3,034,596 | 5/1962 | Twaits, Jr. | 182/3 |
| 3,448,826 | 6/1969 | Rosenblum | 182/3 |
| 3,757,744 | 9/1973 | Pravaz | 182/3 |
| 4,112,865 | 9/1978 | Carn | 244/151 A X |
| 4,273,215 | 6/1981 | Leggett | 182/3 |
| 4,545,773 | 10/1985 | Evert | 182/3 X |
| 4,712,513 | 12/1987 | Huppertsberg | 1182/3 X |
| 4,720,064 | 1/1988 | Herndon | 244/151 R X |
| 4,991,689 | 2/1991 | Cole | 182/3 |
| 5,329,884 | 7/1994 | Bell | 182/3 X |
| 5,433,289 | 7/1995 | O'Rourke | 182/3 |

*Primary Examiner*—Daniel P. Stodola
*Assistant Examiner*—Curtis A. Cohen
(74) *Attorney, Agent, or Firm*—Mau & Krull, P.A.

(57) ABSTRACT

A connector is provided to connect criss-crossing shoulder straps on a body-engaging harness. The connector joins overlapping portions of the shoulder straps while maintaining discrete portions thereof spaced apart. A preferred embodiment of the connector is a unitary piece of rigid plastic having slots formed therein to receive portions of the shoulder straps.

44 Claims, 6 Drawing Sheets

METHODS AND APPARATUS FOR INTERCONNECTING HARNESS STRAPS

This application is a continuation of U.S. Ser. No. 09/084, 030 filed on May 22, 1998, now abandoned.

FIELD OF THE INVENTION

The present invention relates to methods and apparatus for interconnecting criss-crossing straps on a safety harness.

BACKGROUND OF THE INVENTION

Various occupations place people in precarious positions at relatively high heights, thereby creating a need for fall-arresting safety apparatus. Such apparatus requires a reliable lifeline and reliable connections with both a support structure and the person working in proximity to the support structure. U.S. Pat. No. 5,203,829 to Fisk et al. discloses a body-engaging harness suitable for this purpose. As disclosed in the Fisk et al. patent and shown herein in FIGS. 5–6, the Fisk et al. harness 10 generally includes a shoulder strap 12, a waist strap 14, and a seat strap 16.

The shoulder strap 12 includes left and right shoulder strap segments 18 and 20 which pass over respective shoulders of a person. A first end portion of the left shoulder strap segment 18 is fixedly secured to an adjustment member 22 by means of stitching 42. The left shoulder strap segment 18 extends from the adjustment member 22, across a back pad 30 and then into interlaced engagement with a first intermediate portion 26 of the seat strap 16. A second end portion 24 of the left shoulder strap segment 18 extends beyond the juncture with the seat strap 16 and is fixedly secured to a female buckle connector 58.

A first end portion of the right shoulder strap segment 20 is adjustably secured to the adjustment member 22 and thereby connected to the first end portion of the left shoulder strap segment 18. A distal end 25 of the first end portion of the right shoulder strap segment 20 is folded and sewn against itself to discourage removal from the adjustment member 22. The distal end 25 is retained relative to an intermediate portion of the right shoulder strap segment 20 by means of a keeper 70. The intermediate portion of the right shoulder strap segment 20 extends from the adjustment member 22, through a front slide assembly 34, which includes both a D-ring and an adjuster link, and then across the back pad 30. The right shoulder strap segment 20 extends from the back pad 30 into interlaced engagement with a second intermediate portion 38 of the seat strap 16. A second end portion 36 of the right shoulder strap segment 20 extends beyond the juncture with the seat strap 16 and is fixedly secured to a female buckle connector 58.

The back pad 30 cooperates with a D-ring 29 to define a suspension assembly 28. The strap segments 18 and 20 are connected to the back pad 30 by heavy duty stitching 32, and the D-ring 29 is secured to the back pad 30 by webbing extending between discrete sections of the stitching 32. The resulting suspension assembly 28 provides an anchorage point for a fall arrest line and also encourages proper use of the harness by giving it shape which suggests how to correctly secure the harness about a person.

A first end portion 15 of the waist strap 14 is fixedly secured to the seat strap 16, proximate the second intermediate portion 38 thereof. An intermediate portion of the waist strap 14 passes through the front slide assembly 34. A second end portion of the waist strap 14 is connected to a male buckle connector 56. An adjustment assembly 60 is provided on the second end portion of the waist strap 14 to facilitate adjustments to the length of the waist strap 14. The harness 10 may be further adjusted by moving the adjuster link on the front slide assembly 34 away from the D-ring along the right shoulder strap segment 20 and the waist strap 14; repositioning the right shoulder strap segment 20 and the waist strap 14 relative to respective portions of the D-ring; and moving the adjuster link back toward the D-ring.

As noted above, the first intermediate portion 26 of the seat strap 16 is interlaced with the left shoulder strap segment 18. A female buckle connecter 58 is connected to a distal end of this first intermediate portion 26. A central portion of the seat strap 16 extends between the intermediate portions 26 and 38, and each end portion of the seat strap 16 defines a respective leg strap segment 64 or 66. Spacing tabs 62 are sewn to portions of the seat strap 16 to ensure proper positioning of the leg portions 64 and 66 relative to a person's legs.

A male buckle connector 56 is disposed on each leg portion 64 or 66 before a distal end 65 or 67 of each is folded and sewn against itself to discourage removal of the connector 56. The effective lengths of the leg portions 64 and 66 may be adjusted by repositioning the buckles 56 relative thereto. The distal ends 65 and 67 are retained relative to intermediate portions of respective straps 64 and 66 by means of additional keepers 70. The buckle connectors 56 on the leg portions 64 and 66 selectively interlock with the buckle connectors 58 on the ends of respective shoulder strap segments 18 and 20.

Another conventional body-engaging harness is known in the art as a "vest-type" harness. This prior art harness has shoulder straps which criss-cross across a person's back (between the waist and the shoulders) and extend parallel to one another across a person's chest (between the shoulders and the waist). A transverse strap extends laterally across the person's chest between the two parallel strap portions. Some of these harnesses include another transverse strap which extends between the two criss-crossing strap portions, about eight inches below the dorsal connection point. This additional strap is intended to reduce the likelihood of a person falling out of the harness during a fall arrest. Unfortunately, such an arrangement also impedes adjustability of the harness and/or does not maintain a fixed distance between the additional strap and the dorsal connection point.

An object of the present invention is to provide an improved suspension assembly for body-engaging harnesses. Another object of the present invention is to provide an improved method of interconnecting criss-crossing straps on a body-engaging harness.

SUMMARY OF THE INVENTION

The present invention provides methods and apparatus which facilitate interconnection of criss-crossing harness straps. In a preferred embodiment and/or mode of operation, a triangular connector guides a first strap in a first direction and a second strap in a second direction. Intermediate portions of the straps extend between connection points on the connector and cooperate therewith to retain a D-ring. The arrangement eliminates the need for heavy duty stitching that was otherwise required with the prior art back pad and thereby provides a suspension assembly which is easier and less expensive to manufacture. The arrangement also provides a laterally extending support at a fixed distance beneath the D-ring to span the downwardly widening gap defined between the shoulder straps. Additional features and/or advantages of the present invention may become more apparent from the detailed description which follows.

BRIEF DESCRIPTION OF THE DRAWING

With reference to the Figures of the Drawing, wherein like numerals represent like parts and assemblies throughout the several views.

DETAILED DESCRIPTION OF THE PREFERRED EMBODIMENT

A preferred embodiment connector constructed according to the principles of the present invention is designated as 100 in FIGS. 1–4. The connector 100 is an injection molded piece of plastic having a polyethylene to vinyl ratio of approximately four to one. The connector 100 may be described as a substantially triangular, rigid member having three vertices or connection regions 101, 102, and 104, and three sides 120, 140, and 160. The term "vertex" is used to describe each of three discrete portions which cooperates with the other portions to define a single plane.

Figure 1:
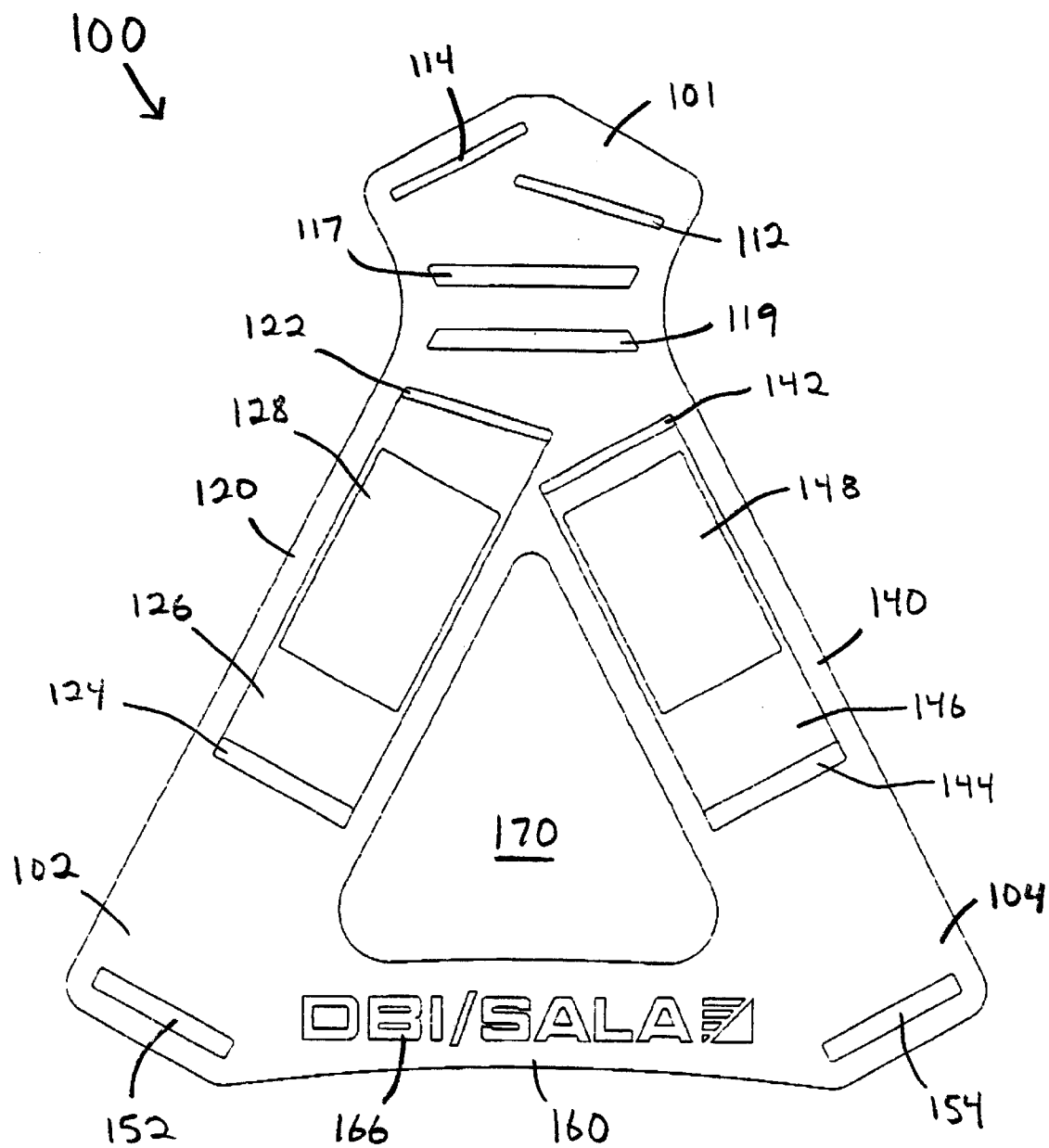
FIG. 1 is a plan view of a connector constructed according to the principles of the present invention.
Figure 2:
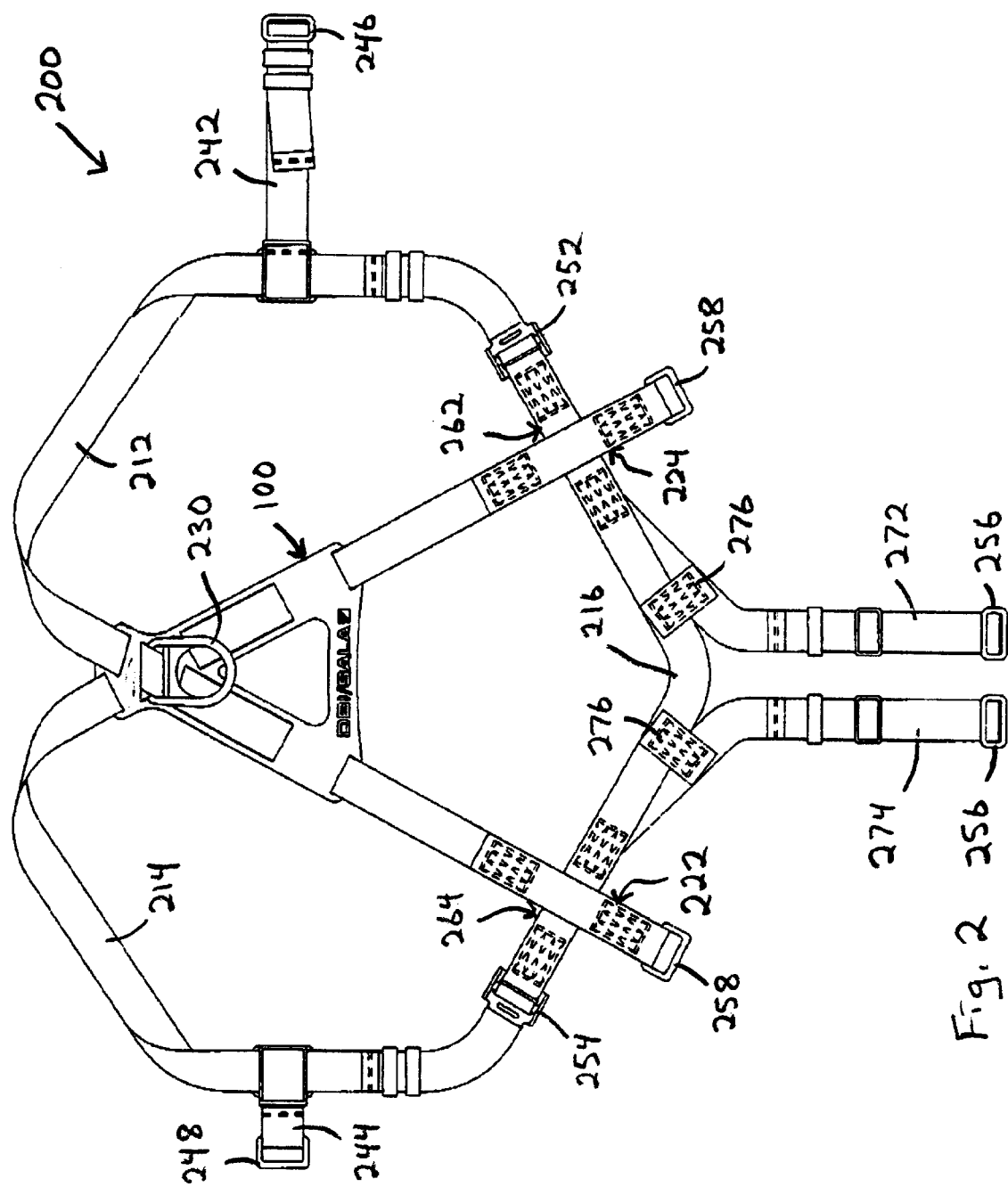
FIG. 2 is a rear view of a harness configured according to the principles of the present invention.
Figure 3:
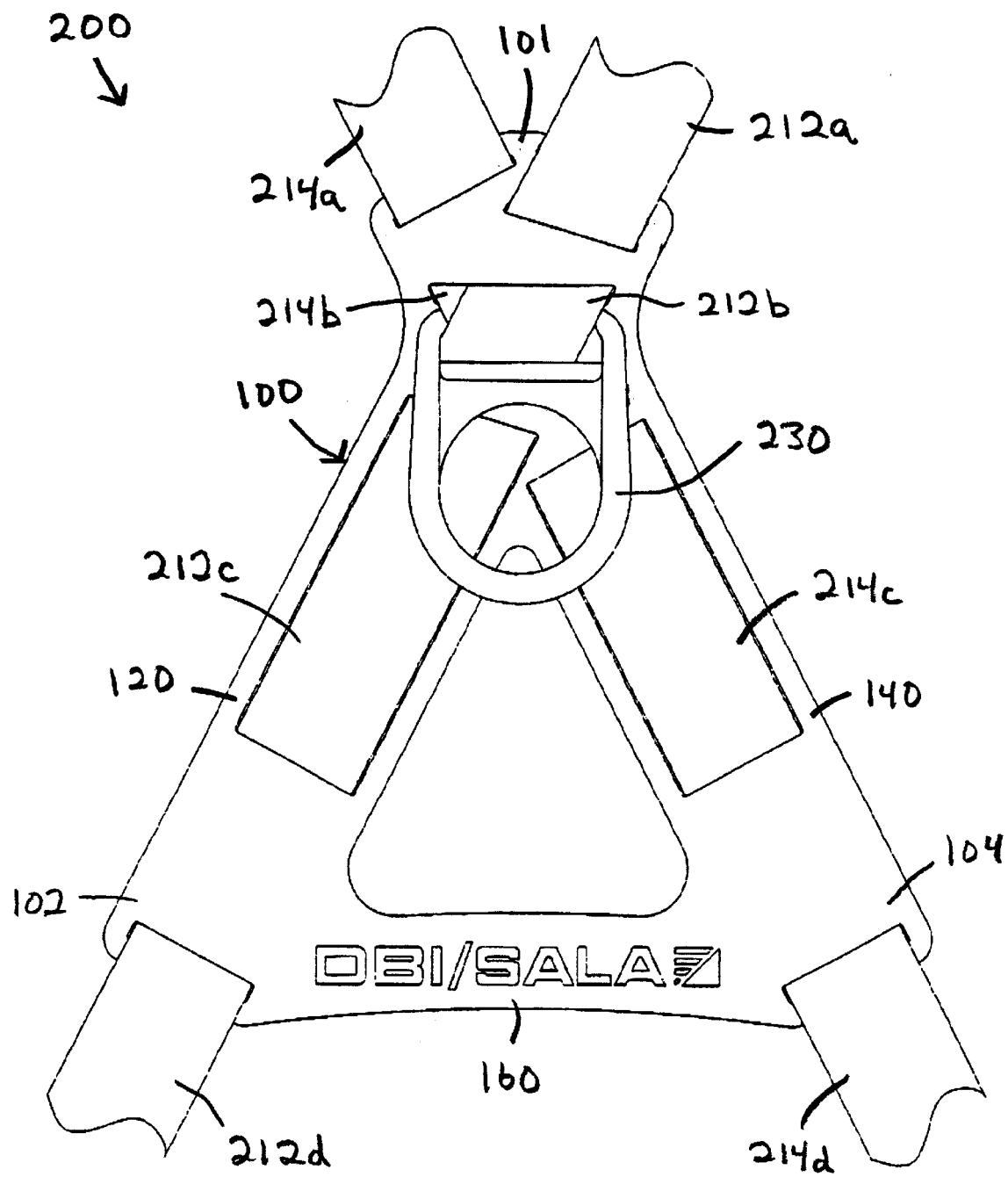
FIG. 3 is a plan view of the connector of FIG. 1 and shoulder strap portions of the harness of FIG. 2.

As shown in FIGS. 1–3, the first vertex or connecting region 101 is configured to receive and interconnect crisscrossing shoulder straps 212 and 214. A first slot 112 is formed in the vertex 101 to receive the strap 212 extending in a first direction. A second slot 114 is formed in the vertex 101 to receive the strap 214 extending in a second direction. Relatively larger, parallel slots 117 and 119 are provided just below the vertex 101 to receive both straps 212 and 214, and to retain a D-ring 230 between the connector 100 and the straps 212 and 214.

The first side 120 of the connector 100 is configured to guide the first strap 212 in a first direction away from the vertex 101. Slots 122 and 124 are formed in the first side 120 to accommodate discrete portions of the first strap 212. A depression or recess 126 is formed in the first side 120 to accommodate the length and thickness of a portion 212c of the first strap 212 disposed between the slots 122 and 124. An opening 128 is formed through the first side 120, within the perimeter of the depression 126, for reasons explained below.

The second side 140 of the connector 100 is configured to guide the second strap 214 in a second direction away from the vertex 101. Slots 142 and 144 are formed in the second side 140 to accommodate discrete portions of the second strap 214. A depression or recess 146 is formed in the second side 140 to accommodate the length and thickness of a portion 214c of the first strap 214 disposed between the slots 142 and 144. An opening 148 is formed through the second side 140, within the perimeter of the depression 146, for reasons explained below.

The third vertex or connecting region 104 is configured to receive and support the second strap 214 and allow same to extend uninterrupted in the second direction. A slot 154 is formed in the third vertex 104 and cooperates with the slot 114 in the first vertex 101 (and the slots 142 and 144 in the second side 140) to guide the second strap 214 in the second direction. Similarly, the second vertex or connecting region 102 is configured to receive and support the first strap 212 and allow same to extend uninterrupted in the first direction. A slot 152 is formed in the second vertex 102 and cooperates with the slot 112 in the first vertex 101 (and the slots 122 and 124 in the first side 120) to guide the first strap 212 in the first direction.

The third side 160 spans or extends between the second and third vertices 102 and 104 and cooperates with the other sides 120 and 140 to define a triangular opening 170. A company name 166 or some other indication may be provided on the third side 160 to indicate how the connector 100 should be oriented when the harness is being worn properly. The third side 160 may also be described as a means for spanning the lower end of the opening 170 at a fixed distance beneath the first vertex 101 and/or the D-ring 230, and/or as a means for limiting or reducing the opening between the strap segments 212c and 212d and the strap segments 214c and 214d.

Since the connector 100 is rigid, no one side of the connector is absolutely necessary to practice the present invention. For example, the connector may be modified in a manner which eliminates the first side or the second side (recognizing that structural integrity issues may result from such a change).

The preferred embodiment 100 is generally symmetrical about a center line drawn perpendicularly through the third side 160 and the slots 117 and 119. The slots 112 and 152 are approximately eleven inches apart, as are the slots 114 and 154. A line drawn perpendicular to the slots 112 and 152 defines an angle of approximately fifty-five degrees relative to a line drawn perpendicular to the slots 114 and 154.

FIG. 3 shows how the harness straps 212 and 214 and the D-ring 230 are preferably connected to the connector 100. First strap portions 212a and 214a extend upward away from the first vertex 101 and in divergent fashion (away from one another) toward a person's shoulders. Second strap portions 212b and 214b are disposed between slots 117 and 119 and cooperate with the connector 100 to retain the D-ring 230 therebetween. The third strap portions 212c and 214c are disposed between respective slots 122 and 124 and 142 and 144, just inside the perimeter of respective depressions 126 and 146. The fourth strap portions 212d and 214d extend downward from respective vertices 102 and 104 and in divergent fashion (away from one another) toward a person's waist.

Another advantage of the foregoing arrangement is that no stitching is required to form the resulting suspension assembly. As a result, there is less opportunity for human error during manufacture, assembly costs are reduced, and tighter quality control is maintained. Adjustment members, like those commonly used with buckles, could be provided to encourage the connector to remain in a particular position relative to the straps. In any event, the third side 160 interconnects the straps segments 212d and 214d at a fixed position beneath the D-ring 230.

FIG. 2 shows a "vest-type" harness 200 constructed according to the principles of the present invention. The harness 200 generally includes shoulder straps 212 and 214, chest straps 242 and 244, a seat strap 216, and leg straps 272 and 274.

The right shoulder strap 212 has a first end portion adjustably secured to a "right side" of the seat strap 216 at buckle 252. The right shoulder strap 212 extends from the buckle 252 through the connector 100 and then into interlaced engagement with a "left side" intermediate portion 264 of the seat strap 216. A second end portion 222 of the right shoulder strap 212 extends beyond the juncture with the seat strap 216 and is secured to a female buckle connector 258.

The left shoulder strap 214 has a first end portion adjustably secured to a "left side" of the seat strap 216 at buckle 254. The left shoulder strap 214 extends from the buckle 254 through the connector 100 and then into interlaced engagement with a "right side" intermediate portion 262 of the seat strap 216. A second end portion 224 of the left shoulder strap 214 extends beyond the juncture with the seat strap 216 and is secured to a female buckle connector 258. The connector 100 cooperates with a D-ring 230 to define a suspension assembly that provides an anchorage point for a fall arrest line and also contributes to the shape of the harness 200 when in a "relaxed" state.

The "right side" chest strap 242 is connected to the right shoulder strap 212 intermediate the buckle 252 and the connector 100. A male buckle connector 246 is connected to a distal end of the right side chest strap 242. The "left side" chest strap 244 is connected to the left shoulder strap 214 intermediate the buckle 254 and the connector 100. A female buckle connector 248 is connected to a distal end of the left side chest strap 244. The buckle connectors 246 and 248 selectively interconnect to form a continuous span of webbing across a person's chest.

A central portion of the seat strap 216 extends between the intermediate portions 262 and 264, and each end portion of the seat strap 216 defines a respective leg strap segment 272 or 274. Spacing tabs 276 are sewn to portions of the seat strap 216 to encourage proper positioning of the leg portions 272 and 274 relative to a person's legs.

A male buckle connector 256 is disposed on each leg portion 272 or 274 before a distal end of each is folded and sewn against itself to retain the connector 256. The buckle connectors 256 on the leg portions 272 and 274 selectively interlock with the buckle connectors 258 on the ends of respective shoulder straps 214 and 212, to form closed loops about a person's legs.

The present invention may also be described in terms of methods of making a body-engaging harness. One such method may be described in terms of inserting right and left straps through slots in a connector so that they cross over one another and extend in divergent fashion away from the common juncture. Another such method may be described in terms of guiding right and left straps in discrete directions away from a connector that joins overlapping portions thereof. Yet another method may be described in terms of forming a rigid member having at least three connection regions which are disposed in triangular fashion relative to one another; connecting a first strap to two of the connection regions; and connecting a second strap to two of the connection regions in such a manner that at least one strap is connected to each of the connection regions.

Figure 4:
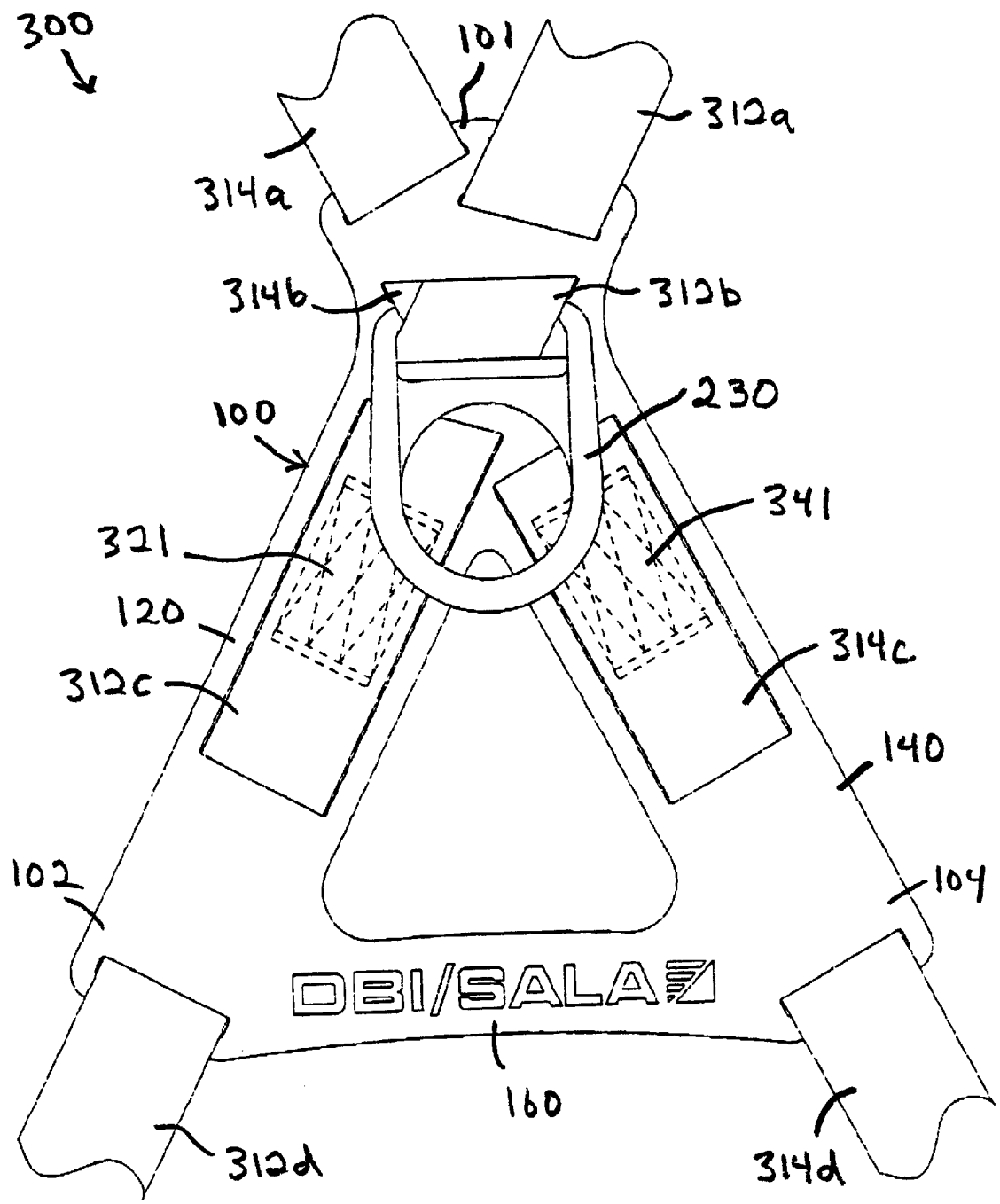
FIG. 4 is a plan view of the connector of FIG. 1 secured to shoulder strap portions of another harness.
Figure 5:
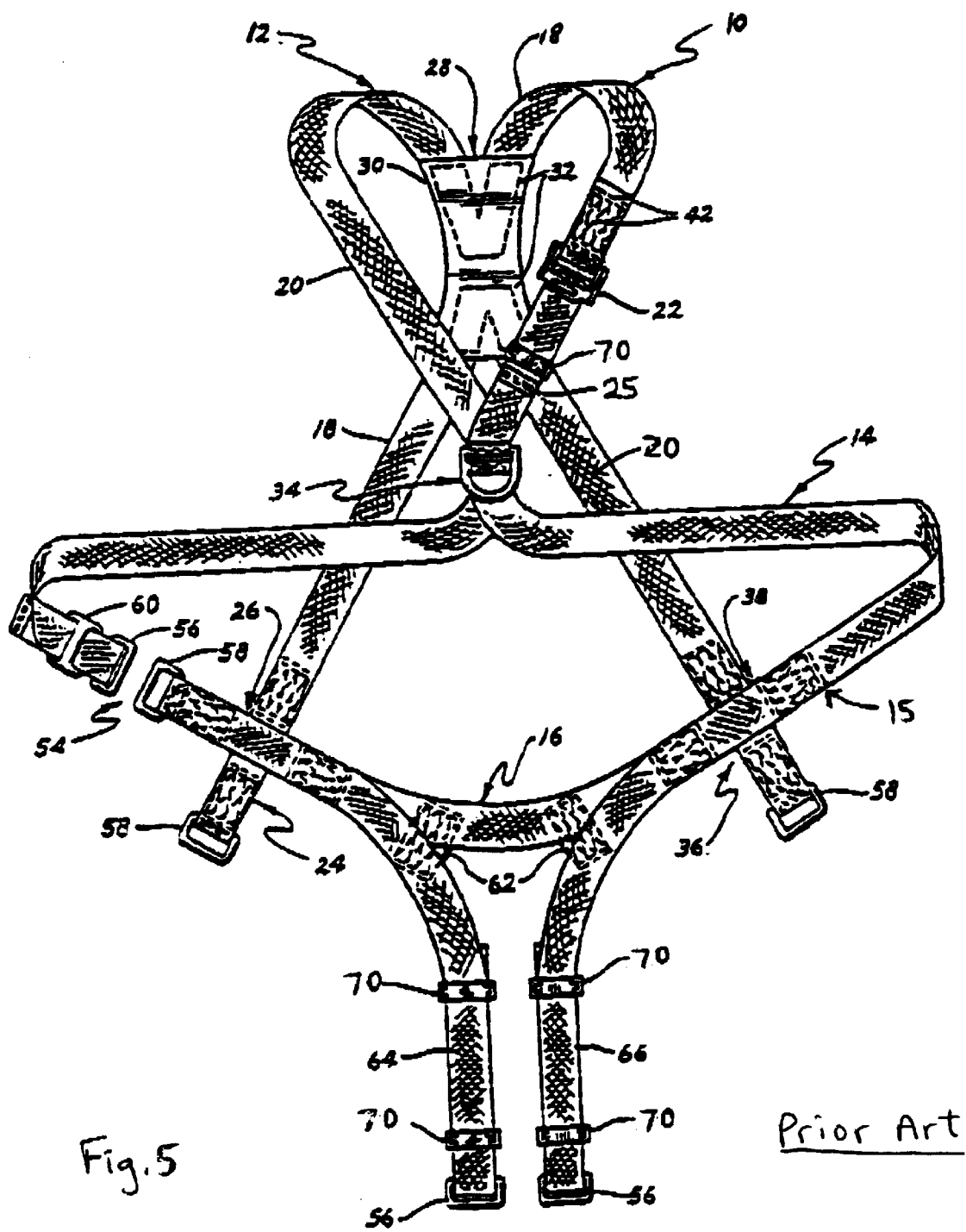
FIG. 5 is a front view of a prior art harness.
Figure 6:
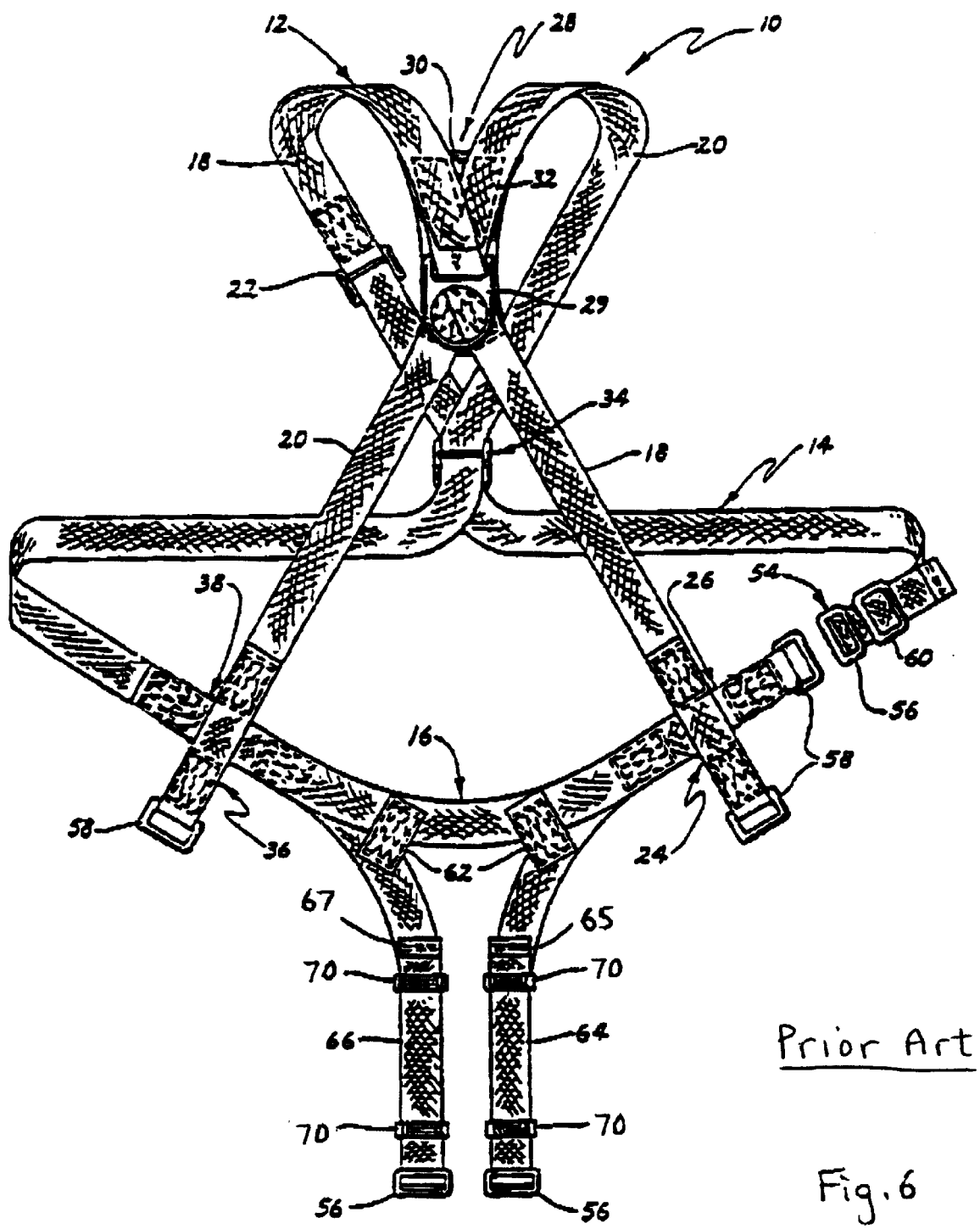
FIG. 6 is a rear view of the prior art harness of FIG. 5.

As suggested by FIG. 4, the foregoing method may comprise an additional step of sewing on intermediate portions of the straps which are disposed between slots on the connector. In this regard, the openings or windows 128 and 148 in the connector 100 provide sufficient space for stitching 321 and 341 to be secured to the strap portions 312c and 314c, respectively. One possible application for such stitching is to secure discrete pieces of webbing between the portions 312c and 314c and either respective portions 312a and 314a or portions 312d and 314d, in order to anchor the connector 100 in a relatively fixed position relative to the shoulder straps. The resulting harness 300 similarly retains a D-ring 230 between the connector 100 and intermediate strap portions 312b and 314b.

Although the present invention has been described with reference to a preferred embodiment and particular methods, this disclosure will enable those skilled in the art to recognize additional embodiments and/or methods which fall within the scope of the present invention. Accordingly, the scope of the present invention should be limited only to the extent of the following claims.

What is claimed is:

1. A method of making a body-engaging harness having criss-crossing straps, comprising the steps of:

forming a rigid member having at least three connection regions which are disposed in triangular fashion relative to one another;

connecting a first strap to two of the connection regions in such a manner that the first strap extends linearly through a first individual slot in the rigid member, then through a common slot in the rigid member, and then through a second individual slot in the rigid member; and connecting a second strap to two of the connection regions in such a manner that the second strap extends linearly through a third individual slot in the rigid member, then through the common slot, and then through a fourth individual slot in the rigid member, and each of the connection regions supports at least one said strap.

2. The method of claim 1, wherein the rigid member is formed to provide at least two common slots between the two connection regions for the first strap and between the two connection regions for the second strap, and each said strap is routed linearly through each of the two common slots.

3. The method of claim 2, further comprising the step of mounting a D-ring on a portion of each said strap extending between the two common slots.

4. The method of claim 1, wherein the rigid member is formed with depressions configured and arranged to accommodate intermediate portions of the straps extending between respective connection regions.

5. The method of claim 1, wherein the rigid member is formed with an opening disposed between the common slot and the second individual slot.

6. The method of claim 5, further comprising the step of sewing on a portion of the first strap overlying the opening.

7. The method of claim 1, wherein the criss-crossing straps define a juncture and the rigid member is formed to extend between the straps at a fixed distance of at least six inches away from the juncture.

8. A method of making a body-engaging harness having criss-crossing straps, comprising the steps of:

forming a rigid member with a plurality of slots sized and configured to support first and second straps in overlapping and divergent relationship to one another;

routing the first of the straps linearly in a first direction through six of the slots; and routing the second of the straps linearly in a second direction through six of the slots, wherein the second direction is skewed relative to the first direction, and wherein each of the straps is routed linearly through a least two common slots.

9. The method of claim 8, wherein the first of the straps is routed through four of the slots exclusive of the second of the straps.

10. The method of claim 8, further comprising the step of mounting a D-ring on each of the straps between a first of the common slots and a second of the common slots.

11. The method of claim 8, wherein the first of the straps extends first through an individual slot and last through an individual slot, and the second of the straps extends first through an individual slot and last through an individual slot.

12. A method of making a fall-arresting, full-body harness having criss-crossing straps, comprising the steps of:

forming a triangular member having three sides, an upper corner region, a left side corner region, and a right side corner region, wherein each said side corner region is spaced approximately eleven inches apart from the upper corner region;

connecting a first criss-crossing strap to both the upper corner region and the left side corner region in such a manner that the first strap is encouraged to extend approximately eleven inches along one of the sides; and connecting a second criss-crossing strap to both the upper corner region and the right side corner region in such a manner that the second strap is encouraged to extend approximately eleven inches along another of the sides, whereby the first strap and the second strap extend downward in divergent fashion from the upper corner region to respective side corner regions.

13. The method of claim 12, wherein each said strap is inserted through respective slots in the triangular member.

14. The method of claim 13, wherein the triangular member is formed to provide an intermediate connection region beneath the upper corner region, and each said strap is inserted through at least one slot in the connection region.

15. The method of claim 14, further comprising the step of mounting a D-ring on a portion of each strap secured to the triangular member at the intermediate connection region.

16. The method of claim 12, wherein each said strap is inserted through two common openings in the triangular member.

17. The method of claim 16, further comprising the step of mounting a D-ring on a portion of each said strap disposed between the two common openings.

18. The method of claim 12, wherein the triangular member is formed by injection molding.

19. The method of claim 18, wherein the triangular member is formed with a triangular opening centrally located between the sides, so that a respective elongate plastic strip extends along each of the sides.

20. The method of claim 18, wherein at least one of the straps is secured to a respective one of the sides of the triangular member by stitching.

21. A method of making a fall-arresting, full-body harness having criss-crossing straps, comprising the steps of:

forming a triangular member having three elongate strips arranged to form an acute triangle with three corner regions;

connecting a first of the straps to two of the corner regions so that the first of the straps extends along and parallel to a first one of the strips, from a common, upper one of the corner regions to a second of the corner regions; and connecting a second of the straps to two of the corner regions so that the second of the straps extends along and parallel to a second one of the strips, from the common, upper one of the corner regions to a third of the corner regions, and respective portions of the straps overlap at the common, upper one of the corner regions, and respective portions of the straps are held apart by the second of the corner regions and the third of the corner regions.

22. The method of claim 21, wherein each of the straps is inserted through respective slots in respective regions of the triangular member.

23. The method of claim 22, wherein the triangular member is formed to provide an intermediate connection region proximate the upper corner region, and each of the straps is inserted through at least one slot in the connection region.

24. The method of claim 23, further comprising the step of mounting a D-ring on a portion of each of the straps secured to the triangular member at the intermediate connection region.

25. The method of claim 21, wherein each of the straps is inserted through two common openings in the triangular member.

26. The method of claim 25, further comprising the step of mounting a D-ring on a portion of each of the straps disposed between the two common openings.

27. The method of claim 21, wherein the triangular member is formed by injection molding.

28. The method of claim 27, wherein at least one of the straps is secured to a respective one of the strips by stitching.

29. The method of claim 21, wherein the upper one of the corner regions is spaced approximately eleven inches from each of the other corner regions.

30. A method of making a fall-arresting, full-body harness having criss-crossing straps, comprising the steps of:

forming a plastic member having a first elongate strip and a second elongate strip which are integrally connected to one another at a vertex, and which extend in divergent fashion from the vertex to respective distal ends, thereby defining an acute angle and an opening therebetween;

connecting a first criss-crossing strap to opposite ends of the first strip so that the first strap extends linearly along the first strip and to one side of the opening; and connecting a second criss-crossing strap to opposite ends of the second strip so that the second strap extends linearly along the second strip and to an opposite side of the opening, and so that the second strap overlaps the first strap at the vertex.

31. The method of claim 30, wherein the plastic member is formed by injection molding.

32. The method of claim 30, wherein each said strip is approximately eleven inches long.

33. The method of claim 30, wherein the plastic member is provided with a third strip which is integrally interconnected between the respective distal ends of the first strip and the second strip.

34. The method of claim 30, wherein each said strap is inserted through slots in both the vertex and a respective strip.

35. The method of claim 34, further comprising the step of mounting a D-ring on a portion of each said strap secured to the plastic member proximate the vertex.

36. The method of claim 30, wherein each said strap is inserted through two common openings in the plastic member.

37. The method of claim 36, further comprising the step of mounting a D-ring on a portion of each said strap disposed between the two common openings.

38. The method of claim 30, wherein at least one of the straps is secured to a respective strip by stitching.

39. A method of making a fall-arresting, full-body harness having criss-crossing straps, comprising the steps of:

interconnecting overlapping portions of a first strap and a second strap in such a manner that the first strap and the second strap extend in divergent fashion from a juncture defined therebetween;

connecting a first end of a plastic member to a distal portion of the first strap at a distance apart from the juncture, such that an intermediate portion of the first strap is defined between the first end and the juncture; and connecting a second end of the plastic member to a distal portion of the second strap at the same distance apart from the juncture, such that an intermediate portion of the second strap is defined between the second end and the juncture, wherein the plastic member maintains the distal portion of the first strap at a desired distance from the distal portion of the second strap, and the plastic member and each said intermediate portion cooperate to define a triangular opening therebetween.

40. The method of claim 39, wherein an additional connection is provided between the plastic member and the juncture.

41. The method of claim 40, wherein the plastic member is provided with an integral extension which extends from at least one said end to the juncture, and at least one said strap is slidably secured to the plastic member proximate the juncture.

42. The method of claim 41, wherein a common distance defined between the juncture and each said end is approximately eleven inches.

43. The method of claim 39, wherein a common distance defined between the juncture and each said end is approximately eleven inches.

44. The method of claim 39, wherein each said strap extends through at least one slot in the plastic member.

* * * * *